United States Patent [19]

Olesik et al.

[11] Patent Number: 5,431,821

[45] Date of Patent: Jul. 11, 1995

[54] GLASSY CARBON IN SEPARATION PROCESSES

[75] Inventors: Susan V. Olesik, Dublin; Matthew R. Callstrom, Columbus; Tina M. Engel, West Chester, all of Ohio

[73] Assignee: The Ohio State University, Columbus, Ohio

[21] Appl. No.: 14,348

[22] Filed: Feb. 5, 1993

Related U.S. Application Data

[63] Continuation-in-part of Ser. No. 832,792, Feb. 7, 1992, abandoned.

[51] Int. Cl.⁶ .............................................. B01D 15/08
[52] U.S. Cl. .................................... 210/635; 210/656; 210/198.2; 210/502.1; 95/82; 95/88
[58] Field of Search ..................... 210/635, 656, 198.2, 210/502.1; 95/82, 88; 96/101; 502/400, 401

[56] References Cited

U.S. PATENT DOCUMENTS

| | | | |
|---|---|---|---|
| 3,116,161 | 12/1963 | Purnell | 117/118 |
| 3,811,927 | 5/1974 | Joo et al. | 117/106 R |
| 3,854,979 | 12/1974 | Rossi | 117/46 CC |
| 3,977,854 | 8/1976 | Fulmer et al. | 65/3 R |
| 3,988,919 | 11/1976 | Talmi et al. | 73/23.1 |
| 4,043,905 | 8/1977 | Novotny et al. | 270/198.2 |
| 4,155,733 | 5/1979 | Sandbank et al. | 65/3 A |
| 4,225,463 | 9/1980 | Unger et al. | 252/445 |
| 4,263,268 | 4/1981 | Knox et al. | 423/449 |
| 4,283,280 | 8/1981 | Brownlee | 210/198.2 |
| 4,293,415 | 10/1981 | Bente, III et al. | 210/198.2 |
| 4,343,767 | 8/1982 | Long et al. | 422/70 |
| 4,457,846 | 7/1984 | Munk | 210/656 |
| 4,479,380 | 10/1984 | Novotny et al. | 73/61.1 C |
| 4,483,773 | 11/1984 | Yang | 210/656 |
| 4,545,904 | 10/1985 | Tehrani et al. | 210/96.1 |
| 4,606,825 | 8/1986 | Crane | 210/635 |
| 4,705,725 | 11/1987 | Glajch et al. | 428/405 |
| 4,746,572 | 5/1988 | Glajch et al. | 428/403 |
| 4,816,338 | 3/1989 | Terasaki et al. | 428/408 |
| 4,818,614 | 4/1989 | Fukui et al. | 428/403 |
| 4,830,921 | 5/1989 | Kitayama et al. | 428/406 |
| 4,834,816 | 5/1989 | Hasegawa et al. | 148/304 |
| 4,834,916 | 5/1989 | Chaudon et al. | 252/633 |
| 4,835,058 | 5/1989 | Komiya et al. | 428/405 |
| 4,842,901 | 6/1989 | Merrem et al. | 427/387 |
| 4,851,382 | 7/1989 | Kusano et al. | 502/401 |
| 4,869,398 | 9/1989 | Colvin et al. | 222/83 |
| 4,882,226 | 11/1989 | Schutyser et al. | 428/407 |
| 4,908,411 | 3/1990 | Kinoshita et al. | 525/285 |
| 4,916,313 | 4/1990 | Hall et al. | 250/282 |
| 4,962,184 | 10/1990 | Smutny | 528/392 |
| 4,966,985 | 10/1990 | Hasegawa et al. | 556/116 |
| 4,970,169 | 11/1990 | Sanders | 436/5 |
| 4,985,506 | 1/1991 | Blum et al. | 525/298 |
| 4,996,296 | 2/1991 | Pecht et al. | 530/350 |
| 5,003,020 | 3/1991 | Uchida et al. | 526/322 |
| 5,009,099 | 4/1991 | Wells et al. | 73/1 G |
| 5,015,373 | 5/1991 | Carr et al. | 210/198.2 |
| 5,108,597 | 4/1992 | Funkenbusch | 210/198.2 |
| 5,182,016 | 1/1993 | Funkenbusch | 210/198.2 |
| 5,198,115 | 3/1993 | Stalling | 210/137 |

FOREIGN PATENT DOCUMENTS

1955276  6/1972  Germany .......................... 210/198.2

OTHER PUBLICATIONS

Kinoshita, Carbon: Electrochemical and Physicochemical Property, John Wiley and Sons, New York, 1988, pp. ix–xiii and 13, 14, and 413.

Callstrom et al., "Doped Glassy Carbon Materials (DGC): Their Synthesis and Investigation of Their Properties" 61 ACS Prep. Prac. Sci. and Eng. 921, 1989 pp. 921–923.

Shomburg, vol. 10, No. 5, Trends in Analytical Chemistry 1991, pp. 163–169.

(List continued on next page.)

Primary Examiner—Ernest G. Therkorn
Attorney, Agent, or Firm—Frank H. Foster

[57] ABSTRACT

A separation process includes producing low temperature glassy carbon from an aromatic oligomeric precursor with acetylene groups and using the resultant glassy carbon as the stationary phase in a separation process. Glassy carbon with preselected selectivity and retention characteristics can be generated by controlling the temperature of which the glassy carbon is processed.

14 Claims, 9 Drawing Sheets

OTHER PUBLICATIONS

Bassler et. al., "The Application of Porous Graphitic Carbon as an HPLC Stationary Phase", Journal of Chromatographic Science, vol. 27, Apr. 1989, pp. 162–165.

Belliardo et al., "Development and use of carbon adsorbents in the liquid chromatographic separation of isomers", Journal of Chromatography, 506 (1990), pp. 371–377.

Berek et al., "Silica Gel and Carbon Column Packings for Use in High-Performance Liquid Chromatography", Chromatographia, vol. 30, No. 9/10, pp. 582–590 Nov. 1990.

Bruner et al., "Performance and use of Wall-coated Open Tubular Fused-Silica Columns with Liquid-Modified Graphitized Carbon Black", Journal of Chromatography, 399 (1987), pp. 87–97.

Bruner et al., "Role of the Liquid Phase in Gas-Liquid-Solid Chromatography and Its Influence on Column Performance—An Experimental Approach", Analytical Chemistry, vol. 45, No. 11, pp. 1851–1859 Sep. 1973.

Callstrom et al., "Doped Glassy Carbon Materials (DGC): Low-Temperature Synthesis, Structure, and Catalytic Behavior", J. Am. Chem. Soc., 1990, 112, 4954–4956.

Chiantore et al., "Characterization of Porous Carbons for Liquid Chromatography", Anal. Chem., 1988, 60, pp. 638–642.

Ciccioli et al., "An Experimental Method for Testing the Solvophobic Theory by Using Graphitized Carbon Black in GC and LC", Chromatographia, vol. 16, pp. 330–335, 1983.

Ciccioli et al., "Graphitized Carbon Black Columns for High-Performance Liquid Chromatography", Journal of Chromatography, 206, 1981, pp. 35–42.

Colin et al., "Modified Carbon Black in High-Performance Liquid Chromatography", Journal of Chromatography, 119, 1976, pp. 41–54.

Colin et al., "Reversed-Phase Liquid-Solid Chromatography on Modified Carbon Black", Journal of Chromatography, 122, 1976, pp. 223–242.

Colin et al., "Development and Use of Carbon Adsorbents in High-Performance Liquid-Solid Chromatography", Journal of Chromatography, 126, 1976, pp. 43–62.

Colin et al., "Development and Use of Carbon Adsorbents in High-Performance Liquid-Solid Chromatography", Journal of Chromatography, 137, 1977, pp. 19–33.

Colin et al., "Comparison of Some Packings for Reversed-Phase High-Performance Liquid-Solid Chromatography", 158, 1978, pp. 183–205.

Colin et al., "The Role of Temperature in Reversed-Phase High-Performance Liquid Chromatography Using Pyrocarbon-Containing Adsorbents", Journal of Chromatography, 167, 1978, pp. 41–65.

Crescentini et al., "Discussion of Thermodynamic Data Obtained by Adsorption Gas Chromatography of Hydrocarbons on Graphitized Carbon Blacks", Journal of Chromatography, 392, 1987, pp. 83–94.

Cui et al., "High-Performance Liquid Chromatography Using Mobile Phases with Enhanced Fluidity", Anal. Chem., 63, 1812–1819 Sep. 1991.

Dubgen, "Glassy Carbon—A Material for Use in Analytical Chemistry", Canadian Chemical News, pp. 13–16 Mar. 1987.

Eltekova, "Retention Times and Heats of Adsorption of Aromatic Compounds on Carbon Adsorbents", Journal of Chromatography, 506, 1990, 335–341.

Engel et al., "Polymerization of Formic Acid on Porous Glassy Carbon Surface", Journal Microcolumn Separations, vol. 3, No. 3, 1991, pp. 213–215.

Engel et al., "Solvent Strength Model for Supercritical Fluid Chromatography on a Porous Glassy Carbon Stationary Phase", Analytical Chemistry, vol. 63, No. 17, pp. 1830–1838 Sep. 1991.

Engel et al., "Supercritical Fluid-Solid Chromatography Using a Carbonaceous Stationary Phase", Analytical Chemistry, vol. 62, No. 15, pp. 1554–1560 Aug. 1990.

Engel et al., "Supercritical Fluid Solid Chromatography Using Novel Porous Glassy Carbon. Evaluation of Retention Mechanisms", Journal of High Resolution Chromatography, vol. 14, pp. 99–102 Feb. 1991.

Ge et al., "Characterization of Conducting Polymeric Stationary Phases and Electrochemically Controlled High-Performance Liquid Chromatography", Anal. Chem., 1989, 61, pp. 2391–2394.

(List continued on next page.)

OTHER PUBLICATIONS

Ghauri et al., "Chromatographic Observations on Porous Graphitic Carbon", Analytical Proceedings, vol. 26, pp. 69–73, Feb. 1989.

Gierak et al., "Preparation of Carboneous Adsorbents by Catalytic Decomposition of Hydrocarbons for Chromatographic Application", Journal of Chromatography, 483, 1989, pp. 197–207.

Gilbert et al., "Porous Glassy Carbon, A New Columns Packing Material for Gas Chromatography and High–Performance Liquid Chromatography", Chromatographia, vol. 16, pp. 138–146 1982.

Goretti et al., "Evaluation of Graphitized Glass Capillary Columns", J. of High Resolution Chrom. & Chrom. Communications, pp. 143–148 Sep. 1978.

Goretti et al., Chromatographia, vol. 8, No. 9, pp. 486–490 Sep. 1975.

Grob, "Polare Impragnierung von Glaskapillaren fur die Gas–Chromatographie", Helvetica Chimica Acta, vol. 48, Fasciculus 6, pp. 1362–1370 Sep. 1965.

Grob, "Glaskapillaren fur die Gas–chromatographie. Verbesserte Erzeugung and Prufung stabiler Trennflussigkeitsfilme", Helvetica Chimica Acta, vol. 51, Fasciculus 4, 1968, pp. 718–737.

Gu et al., "Separation of Anionic and Cationic Compounds of Biomedical Interest by High–Performance Liquid Chromatography on Porous Graphitic Carbon", Journal of Chromatography, 515, 1990, pp. 183–192.

Guiochon et al., "Carbon Adsorbents in Liquid Chromatography", Chromatography Review, pp. 2–4 Sep. 1978.

Kaliszan et al., "Mechanism of Retention in High–Performance Liquid Chromatography on Porous Graphitic Carbon as Revealed by Principal Component Analysis of Structural Descriptors of Solutes", Journal of Chromatography, 499, 1990, pp. 333–344.

Kamlet et al., "Linear Solvation Energy Relationships. 33. An Analysis of the Factors that Influence Adsorption of Organic Compounds on Activated Carbon", Carbon, vol. 23, 1985, pp. 549–554.

Knox et al., "Carbon in Liquid Chromatography", *Chemical Analysis,* vol. 98, 189–222 1988.

Knox et al., "Structure and Performance of Porous Graphitic Carbon in Liquid Chromatography", Journal of Chromatography, 352, 1986, pp. 3–25.

Mama et al., "Pharmaceutical Applications of Porous Graphitic Carbon in HPLC", Analytical Proceedings, vol. 26, pp. 71–73 Feb. 1989.

Mangani et al., "Chromatographic Properties and Analytical Applications of a Low–Surface Area Graphitized Carbon Black", 289, 1984, pp. 85–94.

Neenan et al., "Doped Glassy Carbon Materials (DGC): Their Synthesis from Polymeric Precursors and Investigation of Their Properties", British Polymer Journal, 23, 1990, pp. 171–177.

Plzak et al., "New Carbon Adsorbent for High–Performance Liquid Chromatography", Journal of Chromatography, 147, 1978, 137–142.

Vidal–Madjar et al., "Gas–Solid and Gas–Liquid Chromatography Using Porous Layer Open Tube Columns Made with Graphitized Thermal Carbon Black", Analytical Chemistry, vol. 49, No. 6, pp. 768–772 May 1977.

Weber et al., "Comparison of Isomer Separation on Carbon–Clad Microporous Zirconia and on Conventional Reversed–Phase High–Performance Liquid Chromatography Supports", Anal. Chem., 1990, 62, pp. 2620–2625.

GLASSY CARBON IN SEPARATION PROCESSES

BACKGROUND OF THE INVENTION

This application is a continuation in part of U.S. Ser. No. 07/832,792, filed Feb. 7, 1992, now abandoned.

The invention relates to the use of low temperature glassy carbon (LTGC) in separation Glassy carbon is a form of sp$^2$-hybridized carbon composed of branched and entangled graphite ribbons. It known to have a unique combination of properties, including chemical and thermal inertness, hardness impermeability gases and liquids, and electrical conductivity. The structure and properties of glassy carbon are well known the art and are described, for example, in Kinoshita, *Carbon: Electrochemical and Physicochemical Properties* (John Wiley and Sons, Now York, 1988). Glassy carbons traditionally have been made by the controlled pyrolysis of organic polymers at temperatures greater than 1000° C. additional heating to 2500°-3000° C. generates an extended sp$^2$-hybridized carbon lattice. More recently Callstrom et al., 112 *J. Am. Chem. Soc.* 4954 (1990); Neenan et al., 23 *Brit. Poly. J* 171 (1990); and Callstrom et al., 61 *ACS Prep. Prac. Sci. and Eng.* 921 (1989) (collectively "the Callstrom articles") described the generation of LTGC from ethynyl or diethynyl aromatic oligomer precursors with very little loss. The LTGCs described in the Callstrom articles include atoms other than carbon, e.g., silicon and Chromatography generally involves the use of a stationary phase contained in a column or on a plate. When a column is used, the stationary phase can be packed in the column in the fern of a porous or non-porous particle, or coated on the interior surface of the column; the latter approach is commonly known as open tubular chromatography. In use, a mixture of compounds to be separated typically is dissolved in a suitable solvent and introduced to the column or the plate. Generally each compound will pass through the column at a different rate depending, for example, on the choice of stationary phase and mobile phase solvent (eluent), as well as conditions of flow rate and temperature, and specific characteristics of the compounds. The chemical and physical nature of the stationary phase usually has the greatest effect in determining relative elution rate.

Depending on the specific type of chromatographic method, the supported stationary phase often has one or more of the following characteristics: (1) a regular particle size, typically between 1–500 μm; (2) the ability to withstand high pressure gradients; (3) low shrinkage or swelling; (4) controlled porosity; (5) near absence of micropores; (6) controlled pore diameter, typically in the 100–4000 angstrom range; (7) homogenous surfaces; and (8) chemical and thermal stability. It is known that, generally, a carbon packing can be used as the stationary phase in chromatography. See, e.g., Guiochon et al., 1978 *Chromatography Review* 2; Knox et al., in *High Performance Liquid Chromatography* 189 (P. R. Brown and R. A. Hartwick, Eds., John Wiley and Sons, New York 1989); and Berek et al., 30 *Chromatographia* 582 (1990).

Knox et al., U.S. Pat. No. 4,263,268, describes the use of a porous glassy carbon packing in chromatography. The material is prepared by depositing a mixture of phenol and hexamine onto porous silica templates; generating a polymer and then carbon in situ by heating to 600°–1100° C.; removing the silica template by washing with a caustic agent; and generating a form of glassy carbon by further heating to 1600°–3000° C. The glassy carbon packing produced gave good chromatographic performance and was amenable to high-pressure chromatographic techniques because of the high structural stability and resistance to chemical attack of the glassy carbon.

Belliardo et al., 506 *J. Chromatogr.* 371 (1990), used phenol-formaldehyde resins, or polysaccharides, to generate a porous glassy carbon packing by a similar procedure to Knox et al. The initial chromatographic results are described as "very promising".

Pyrolytic carbon, which is different from glassy carbon, has also been used as a coating on packing materials for chromatography. Colin et al., 126 *J. Chromatogr.* 43 (1976), describes preparing silica coated with pyrolytic carbon generated from high temperature (ca. 900° C.) treatment of low-molecular weight solvents. Weber et al., 62 *Anal. Chem.* 2620 (1990), teaches a similar procedure to coat zirconia supports with pyrolytic carbon.

Pyrolytic carbon has also been used in open tubular chromatography. Grob, 48 *Helv. Chem. Acta.* 1362 (1965), describes coating the inside of glass open-tubular gas chromatography columns with pyrolytic carbon particles to provide a surface for subsequent coating with polar liquid stationary phases. Goretti et al., 8 *Chromatographia.* 486 (1975), applied carbon black particles as a colloidal suspension to the walls of similar columns and subsequently coated the carbon with liquid stationary phases.

The outer surface of fused silica tubing for chromatographic columns is normally coated with a polyimide film (e.g., Bente et al. U.S. Pat. No. 4,293,415) to protect the surface from scratching and chemical attack.

SUMMARY OF THE INVENTION

The invention features a separation process that uses LTGCs as the stationary phase. The process includes heating an aromatic oligomer including acetylene groups for a sufficient period of time and at a sufficient temperature to cross-link the oligomer to form glassy carbon, and using the glassy carbon in a separation process.

The preferred LTGCs can be produced at low temperatures (typically 200° C.–900° C., preferably 200° C.–800° C.) with minimal mass loss or shrinkage. Because a very high percentage of precursor polymer is converted to glassy carbon during the heating process, even a thin film can be coated on a surface as evidenced by microscopy at high magnification. This results in coated articles for separation techniques having primarily the adsorptive or protective properties of glassy carbon rather than properties of a substrate on which it was coated. As a result, LTGC films that exhibit excellent and different stationary phase properties can be produced easily, in a wide variety of forms (e.g., a coating on the surface of particles and column walls), and in a controlled manner for unique selectivity. The preferred oligomeric precursors are those described in the preferred embodiment section.

The LTGC can be used as the stationary phase in various well-known separation processes, such as liquid, gas, and supercritical fluid chromatography, electrokinetic chromatography, thin layer or planar chromatography, and solid phase extraction. The LTGC can be coated as a thin film on the inside of a standard capillary column made from fused silica or metal, providing a column useful in open tubular chromatography. Alternatively, the LTGC can be generated as a thin film on conventional silica, carbon or metal oxide particles that typically are used as the stationary phase support. Importantly, the preferred LTGC can be coated on a broad range of materials because it becomes "glassy" at temperatures as low as 200° C. and has minimal weight loss in the process. For example, LTGC can be produced on the interior surface of polyimide-coated fused silica open tubes at temperatures compatible with the polyimide coating as described in Bente et al. As a further alternative, particles that consist essentially of LTGC can be used as the column packing.

In another aspect, the invention features a separation apparatus including a stationary phase and a container for the stationary phase. The stationary phase includes a film of LTGC. The container can be, for example, a glass, fused silica, or metal column or a standard glass or plastic thin layer chromatographic plate.

Where the container is a column, the film of glassy carbon can be on the interior surface of the column to provide an open tubular chromatography column suitable for either gas, liquid, or supercritical fluid chromatography, or capillary electrophoresis, or electrokinetic chromatography. The LTGC film by itself can be the stationary phase, or can serve as a surface which can be coated or bonded with another liquid stationary phase. The term "stationary phase", as used herein, is meant to include both uses of the glassy carbon film.

A column can also be packed with particles, like silica, that include the film of LTGC on their surface. Preferred particles vary with the type of separation technique, but generally have an average diameter of less than 500 μm, and more preferably have an average diameter of between 1 μm and 250 μm or between 1 μm and 100 μm. The particles can be either porous or nonporous. Similarly, where the container is a typical thin layer chromatography plate, the film of LTGC can be provided directly on a surface of the plate, but more commonly particles including a film of LTGC on their outer surface can be mounted on a surface of the plate by conventional techniques.

In preferred embodiments, the LTGC film has a thickness of less than 100 μm.

In another aspect, the invention features a stationary phase for chromatography that includes particles made of LTGC.

In another aspect the invention features methods of producing a column or particle (e.g., silica, carbon, metal oxide) coated with a film of LTGC.

Surprisingly, another aspect of the invention is the ability to control the selectivity and/or retentivity of the stationary phase by controlling the processing temperature of the LTGC. The selectivity of a column refers to the relative order of elution of chemically different compounds. The retentivity refers to the amount of time a compound spends in or on the stationary phase.

The capability to control selectivity will be addressed first. The preferred LTGC produced at 200° C. retains nonpolar compounds more strongly than polar ones. Therefore the order of retention is approximately in order of decreasing polarity. However, as the processing temperature of the LTGC increases, the selectivity of the LTGC also increases. The LTGCs processed at 600° C. or above show increased selectivity toward polar compounds. The selectivity of the LTGC is therefore highly tunable between the processing temperatures of 200°–800° C. As a result, for a given chromatographic application, LTGC with controlled selectivity can be produced by adjusting the processing temperature.

Secondly, in a similar way the overall retentivity of the LTGC is controllable. For example, the LTGC processed at 800° C. is markedly more retentive than that processed at 600° C. or 400° C. or 200° C. That is, the retentivity can be varied between the highest and lowest processing temperatures, and marked variation in the retentivity of the LTGC results. For example, open tubular gas chromatography is typically not capable of separating permanent gases because the retentivity of the columns is low. However, the low temperature method of making glassy carbon allows the production of films of glassy carbon on open tubes, and the retentivity of the glassy carbon is controllable. Therefore open tubular columns made with LTGC processed at temperatures of 500° C.–800° C. as the stationary phase will be capable of separating permanent gases; while LTGC processed at lower temperatures, which is less retentive, will be able to separate higher molecular weight compounds.

The glassy carbons of the invention can withstand high pressures, like those often used in high performance liquid chromatography or supercritical chromatography, and high temperatures, like those sometimes used in gas chromatography, without breaking down. The ability to control surface adsorptive properties (by producing LTGC at different temperatures) provides a means to control the retentivity and selectivity of the stationary phase. Importantly, the LTGCs are produced by straightforward procedures in an analogous fashion to the techniques commonly used to produce standard polymer-based chromatographic stationary phases.

Further, glassy carbon conducts electricity, and the conductivity of the glassy carbon produced can be easily controlled by the synthetic procedure. The conductivity may also provide a means of cleaning and regenerating the glassy carbon surface as commonly done in electrochemistry.

The LTGC stationary phases of the invention are useful in all types of chromatography for the separation of both polar and non-polar compounds. "Compounds", as used herein, is meant to encompass all chemical species that conventionally are separated by chromatographic techniques, including organic and inorganic molecules, and ionic species. The LTGCs are especially useful for the separation of compounds that have only slight structural differences, like isomers. They can be used, for example, in the separation of pharmaceuticals, agricultural chemicals, biological molecules and petrochemicals.

Another aspect of the invention features a column (e.g., a chromatographic or electrophoresis column) with an exterior surface coated with a film of LTGC. The exterior film provides good protection for the surface from chemical and mechanical damage, especially when the column is made of fused silica. The exterior film can withstand temperatures of up to at least 400° C., preferably up to at least 550° C.

Other features and advantages of the invention will be apparent from the description of the preferred embodiment thereof, and from the claims.

BRIEF DESCRIPTION OF THE DRAWINGS

The drawings will be described first.

DESCRIPTION OF THE PREFERRED EMBODIMENTS

The preferred LTGCs are prepared from aromatic oligomers containing acetylene groups by the general procedures described in the Callstrom articles. Heteroatoms such as nitrogen or boron can be included in the LTGC by including the heteroatom as part of the aromatic ring in the precursor polymer material. The heteroatoms can aid in the preparation or processing of the oligomer, and in altering the properties (e.g., selectivity) of the LTGC product. Other heteroatoms such as halides or silicon can be substituted for a hydrogen atom in the aromatic ring. Examples of oligomers that are used to generate glassy carbon include the following (Ar=phenyl or biphenyl):

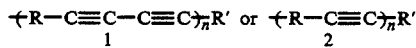

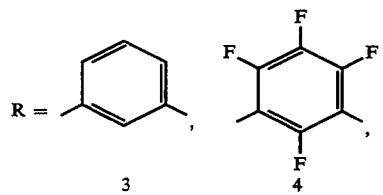

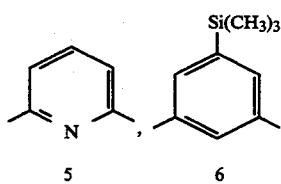

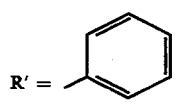

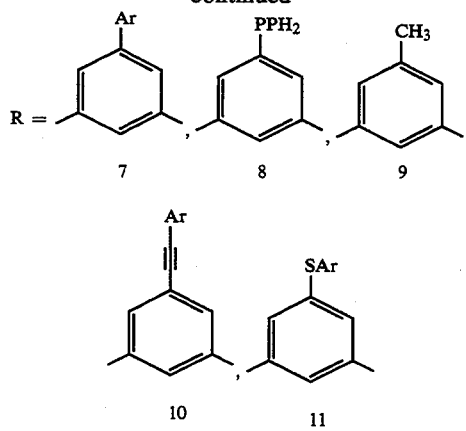

The oligomers are prepared by conventional synthetic techniques such as those described in the Callstrom articles. For example, oligomer 1 with R=3 was prepared in o-dichlorobenzene by the Cu(I)-catalyzed oxidative coupling of 1, 3-diethynylbenzene containing phenylacetylene as the end-capping agent (in either a 3:1 or 10:1 ratio). The other oligomers are prepared analogously. The diacetylene materials also may be reacted with other catalysts such as $Ni(AcAc)_2$ and $Pph_3$ to give suitable precursors.

The molecular weight of the oligomer can vary, and typically can be, e.g., between 1000 and 100,000. Low molecular weight oligomers typically are better suited for optimum coating of particles with small pores; higher molecular weight oligomers may be better suited for large-pore particles and non-porous surfaces like the inside of a capillary or other column or a solid particle.

Figure 6:
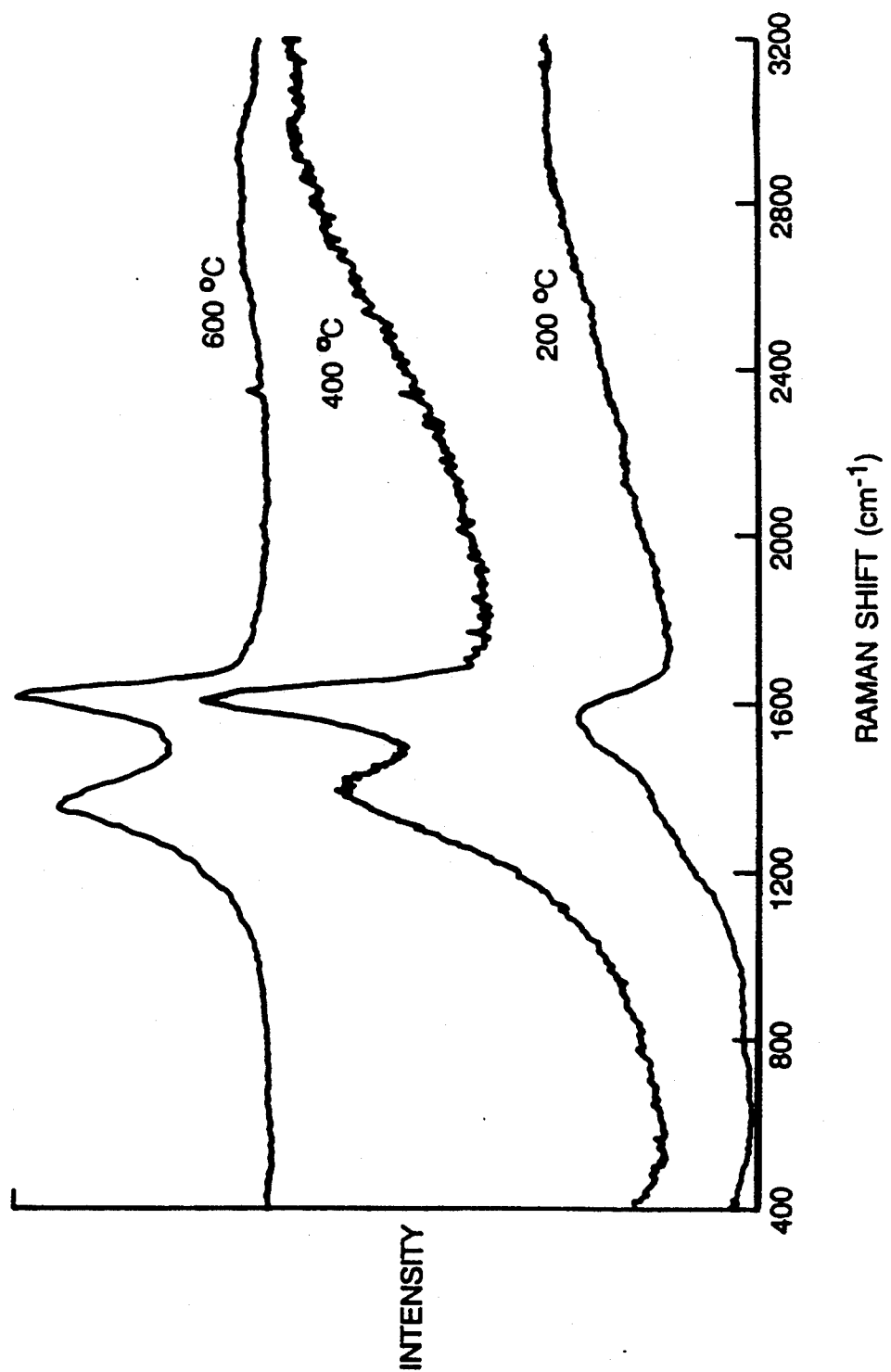
FIG. 6 is an illustration of Raman spectra demonstrating the formation of LTGC from an oligomeric precursor as a function of temperature.

The acetylene groups condense at low temperatures (e.g., less than 400° C.) to form glassy carbon. Further heating to a temperatures up to 900° C. causes the microcrystalline lattice to increase in size, producing a product that is essentially identical to glassy carbon made from other precursors at higher temperatures. The effect of thermal treatment is readily monitored by Raman spectroscopy. For example, referring to FIG. 6, oligomer 1(R=3) was heated first at a rate of 1° C./min to 200° C., followed by 6 hours at 200° C., and then cooled at 1° C./min to 25° C. Samples of the oligomer were also heated to 400° C. and 600° C., by analogous procedure. A spectrum was taken, at the end of each time frame at each target temperature. The 200° C. carbon sample displays an $sp^2$-hybridized carbon microlattice, as shown by both peaks at 1360 and 1580 $cm^{-1}$. Heating the oligomeric precursor "for a sufficient period of time and at a sufficiently high temperature to cross-link the oligomer to form glassy carbon", as used herein, means heating for a sufficiently long time and at a sufficiently high temperature so that the LTGC product has at least the lattice size demonstrated by the 200° C. sample. The 400° C. and 600° C. samples displayed better defined peaks, indicating that the $sp^2$-lattice size was much larger. (Graphite, as a comparison, displays only the peak at 1580 $cm^{-1}$). Because the lattice dimension can be controlled by thermal treatment, it is possible to control some of the properties of the LTGC generated, and to prepare LTGC having different properties for a specific stationary phase application. For example, as the $sp^2$-lattice size increases, so does the conductivity of the sample. The chromatographic characteristics, such as retention and selectivity, of LTGC formed at different temperatures also varies. As the temperature in the final processing step is increased, which corresponds to increasing the microcrystallite size, the retention of flat molecules such as polyaromatic hydrocarbons increases, causing solutes to change in their relative retention to one another.

The oligomers generally are soluble in solvents such as methylene chloride or benzene. Thus, it is possible to coat the interior of an open tubular chromatography column, or the surface of a chromatography packing material substrate (e.g., silica, alumina, metal oxides), with LTGC by wetting the surface of the column or packing material substrate with a solution of the preferred oligomeric precursor, followed by evaporation of the solvent and heating of the column or packing material in an inert atmosphere to generate glassy carbon. Depending on the specific oligomer precursor used, some pretreatment of the column wall or packing material may be necessary. Because there is no significant loss of mass or shrinkage of the oligomeric coating, LTGC on the column or packing material surface is obtained in a reproducible manner. More than one coating of LTGC can be applied to the surface of a column or packing material to affect degree of retention and optimize surface coverage.

Generation and Use of Silica Coated With Glassy Carbon

Porous silica particles (5 µm average diameter with a 300 angstrom average pore diameter obtained from Keystone Scientific, Inc.) were rinsed with distilled water until the water tested pH=7. The water was removed and the particles were heated under argon at 250° C. for 12 hours. A 1 g aliquot of the treated silica particles and 10 ml of methylene chloride were placed in a fluidized bed apparatus prepared in house using a design similar to that described by Payne et al., 62, *Analytical Chemistry*, 1379 (1990). A flow of argon was introduced to the fluidized bed apparatus. A 50 mg aliquot of oligomer 1(R=6) was dissolved in 2 ml of methylene chloride, and the solution was also added to the fluidized bed apparatus. As the methylene chloride evaporated, the walls of the glassware were rinsed with small volumes (~1 ml) of methylene chloride. The apparatus with the precursor-coated silica was placed in an oven while maintaining the argon flow, and the material was heated from 50° C. to 400° C. at 0.5° C./minute and held at 400° C. for a minimum time of 30 minutes to generate silica coated with LTGC. The oven was shut off and the material was allowed to slowly cool to ambient temperature.

In order to modify the microcrystalline lattice size of the LTGC coating, a portion of this material was subsequently put in an evacuated quartz tube, placed in an oven, and heated under argon from 100° C. to 600° C. at a rate of 0.5° C. per minute and held at 600° C. for 6 hours to allow growth of the glassy carbon $sp^2$ lattice size. Different temperatures of final heating corresponds to changing the microcrystallite size on the LTGC which causes markedly different chromatographic retention characteristics as described above. The oven was turned off, and the material was allowed to slowly cool to ambient temperature. Other maximum temperatures (200° C., 400° C., 500° C., and 800° C.) were also used to provide LTGC coatings with differing retention and selectivity characteristics.

The LTGC coated silica particles were subsequently placed in fused silica tubing for use as a chromatographic stationary phase. A slurry of the LTGC coated silica particles was prepared in acetonitrile and placed in a small stainless steel reservoir. The slurry was pushed through 310 µm internal diameter fused silica tubing using a syringe pump maintained at 3000 psi pressure. The packing was held in the column with a microbore column end fitting equipped with a replaceable frit (Upchurch Scientific).

Figure 2:
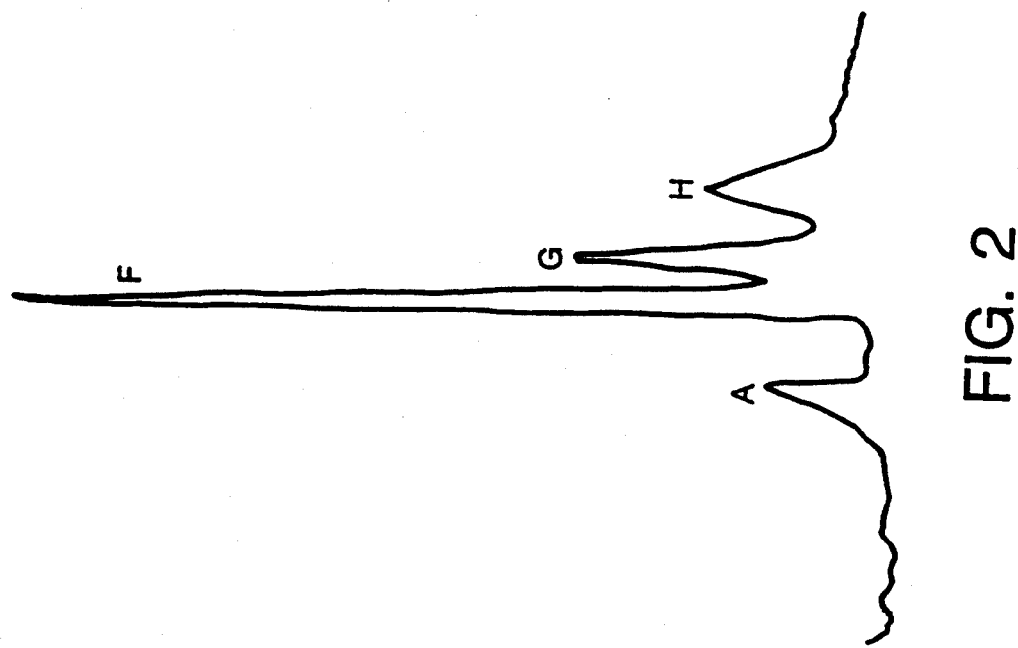
FIGS. 1-3 are illustrations of chromatograms obtained when a column packed with LTGC coated silica is used to separate mixtures of compounds.
Figure 1:
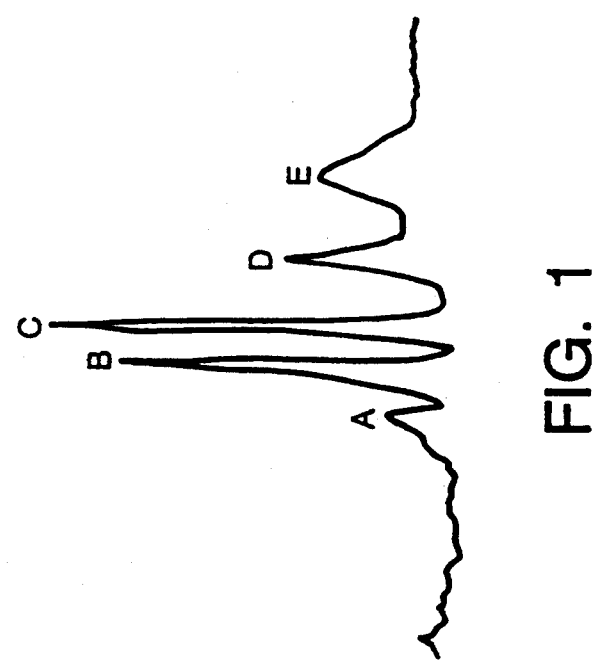
Figure 3:
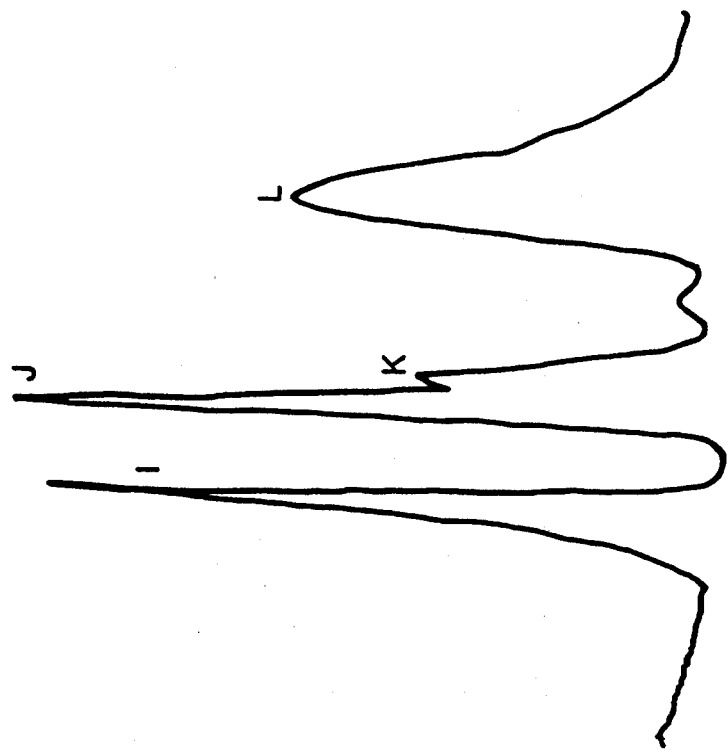

Referring to FIGS. 1–3, the LTGC coated silica prepared at 600° C. was used as a stationary phase for separation of three mixtures by high performance liquid chromatography. The mobile phase used was 40% water in acetonitrile. The mobile phase was delivered at 1500 psi constant pressure using a syringe pump (ISCO LC-2600). The samples consisted of 1 mg of each of $NaNO_3$ (A), benzoic acid (B), phenol (C), benzene (D), ethylbenzene (E), 2-naphthol (F), nitrobenzene (G), chlorobenzene (H), salicylic acid (I), 1-naphthol (J), methylbenzoate (K), and naphthalene (L) dissolved in 1 ml of 50% water in acetonitrile. Samples were introduced onto the column using a high-pressure injection valve fitted with a 200 nl rotor (W-series, Valco Instruments). The analytical column was 35-cm long piece of 310 µm internal diameter fused silica tubing filled with LTGC coated silica (maximum heating temperature 600° C.). An ultraviolet detector set at 210 nm was used to monitor elution of compounds from the analytical column.

Figure 7:
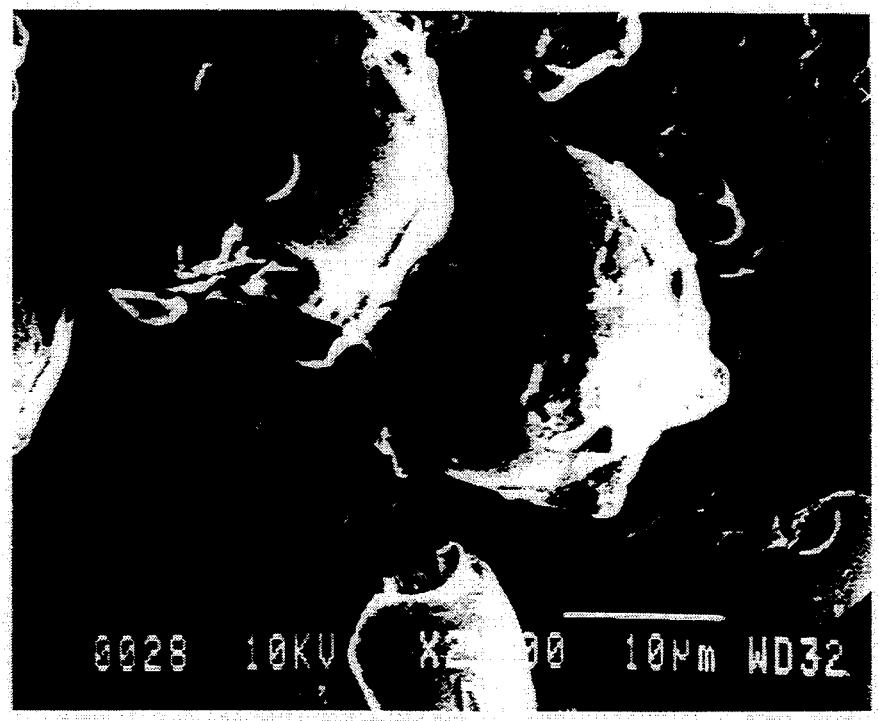
FIG. 7 is an electron micrograph of LTGC-coated nonporous silica particles.

Referring to FIG. 7, a scanning electron micrograph of 30-µm nonporous silica beads coated with LTGC (400° C. temperature treatment using procedure essentially as described earlier for oligomer 1 (R=6)) was generated.

In an alternative embodiment, silica beads deactivated with a phenyl bonded phase (7 µm average diameter with 300 Å average pore diameter, available from Keystone Scientific, Inc.) were coated with oligomer using the evaporative coating procedure described above. However, these silica beads were not rinsed with water or heated prior to coating. The beads were slurried in a 15 mg/Ml solution of oligomer in methylene chloride for five minutes, and then the solution was filtered to isolate the coated beads from the excess solvent. The beads were then transferred to the fluidized bed apparatus, argon flow was introduced, and the beads were slowly heated in an oven to maximum temperatures ranging from 200° C. to 400° C. as described earlier. A portion of the beads was also transferred to an evacuated quartz tube and further heated to maximum temperatures ranging from 500° C. to 800° C.

Figure 9:
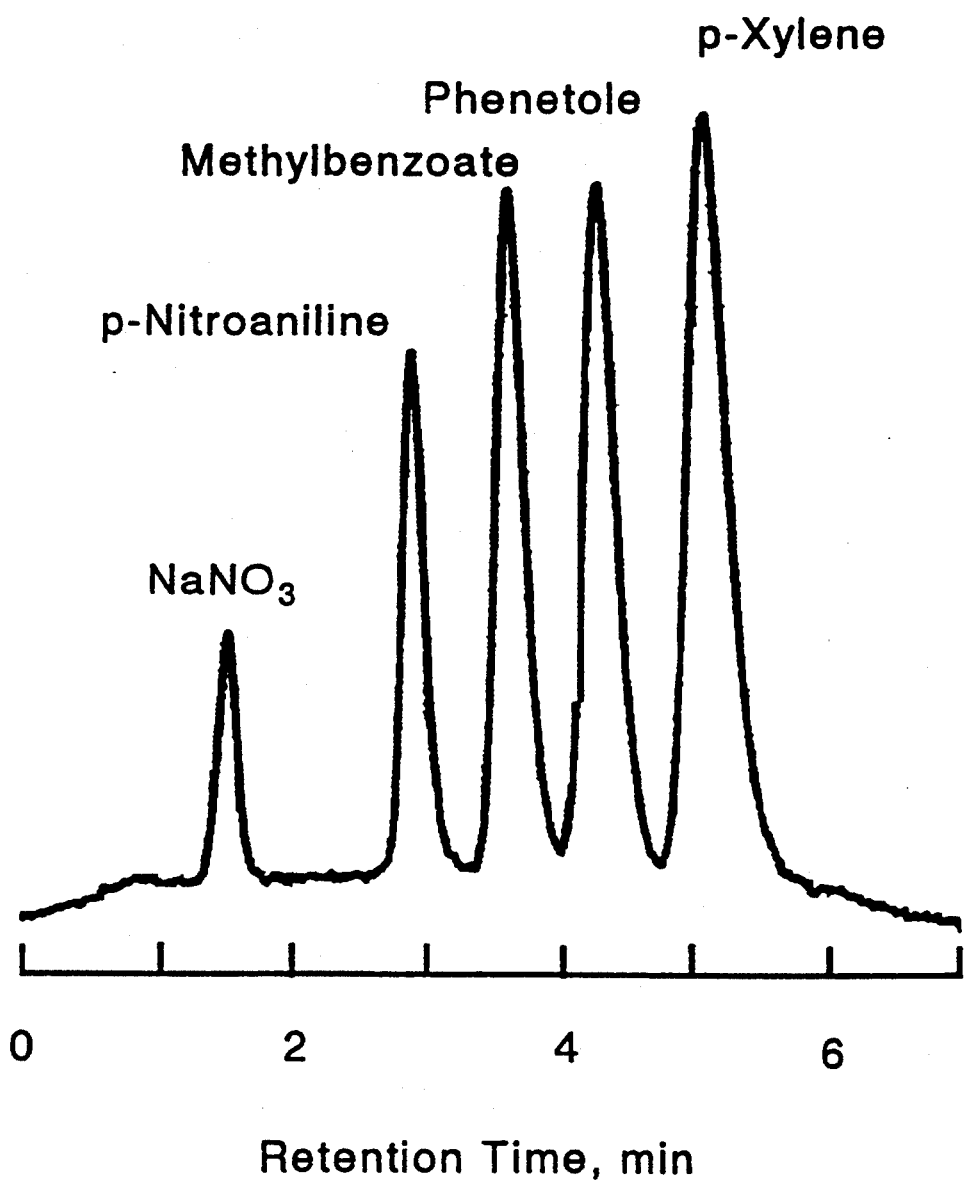
FIG. 9 is a chromatogram of test analytes using LTGC generated at 400° C.

Differences in Selectivity and Retention Characteristics of the Low Temperature LTGC Generated at Different Temperatures The change in the retention mechanism with processing temperature is clearly observed when a standard reversed-phase test mixture is analyzed using columns prepared from LTGC coated silica packings cured at 400° C. and 600° C; sample chromatograms are shown in FIG. 9. This test mixture contains sodium nitrite as a dead volume ($t_o$) indicator and p-nitroaniline, phenetole, methyl benzoate, and p-xylene to indicate retention characteristics.

When a classical reversed-phase stationary phase is used, such as octadecylpolysiloxane, these solutes elute in the order listed above. FIG. 9 shows the elution order of these solutes from a column packed with LTGC cured at 400° C. This elution order is what would be expected for a reversed-phase packing. The most polar analyte, p-nitroaniline, elutes first, and less polar analytes elute increasingly later.

Figure 10:
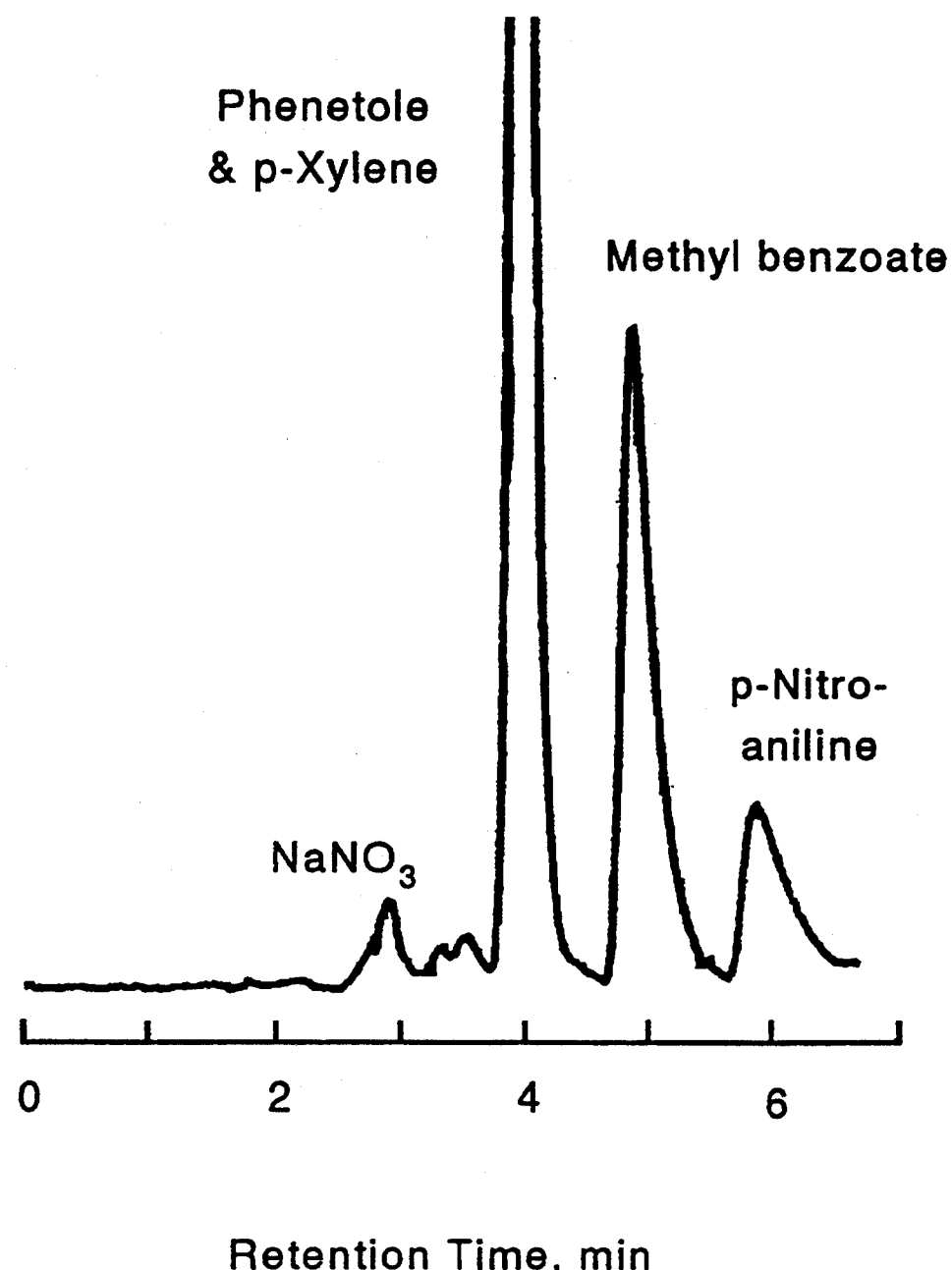
FIG. 10 is a chromatogram of test analytes using LTGC generated at 600° C.

FIG. 10 shows the same mixture analyzed using a column packed with LTGC cured at 600° C. The elution order is markedly different than that in FIG. 9. A stronger mobile phase was used because the overall retentivity of the packing had increased. Also, retention is much more strongly controlled by the polarity of the solute. For example, p-nitroaniline is now the most strongly retained. Although the retention mechanism of glassy carbons has previously been described as "reversed-phase", it is obvious from this example that the retention on glassy carbon is not like that observed from materials such as octadecyl-coated silicas.

Figure 11:
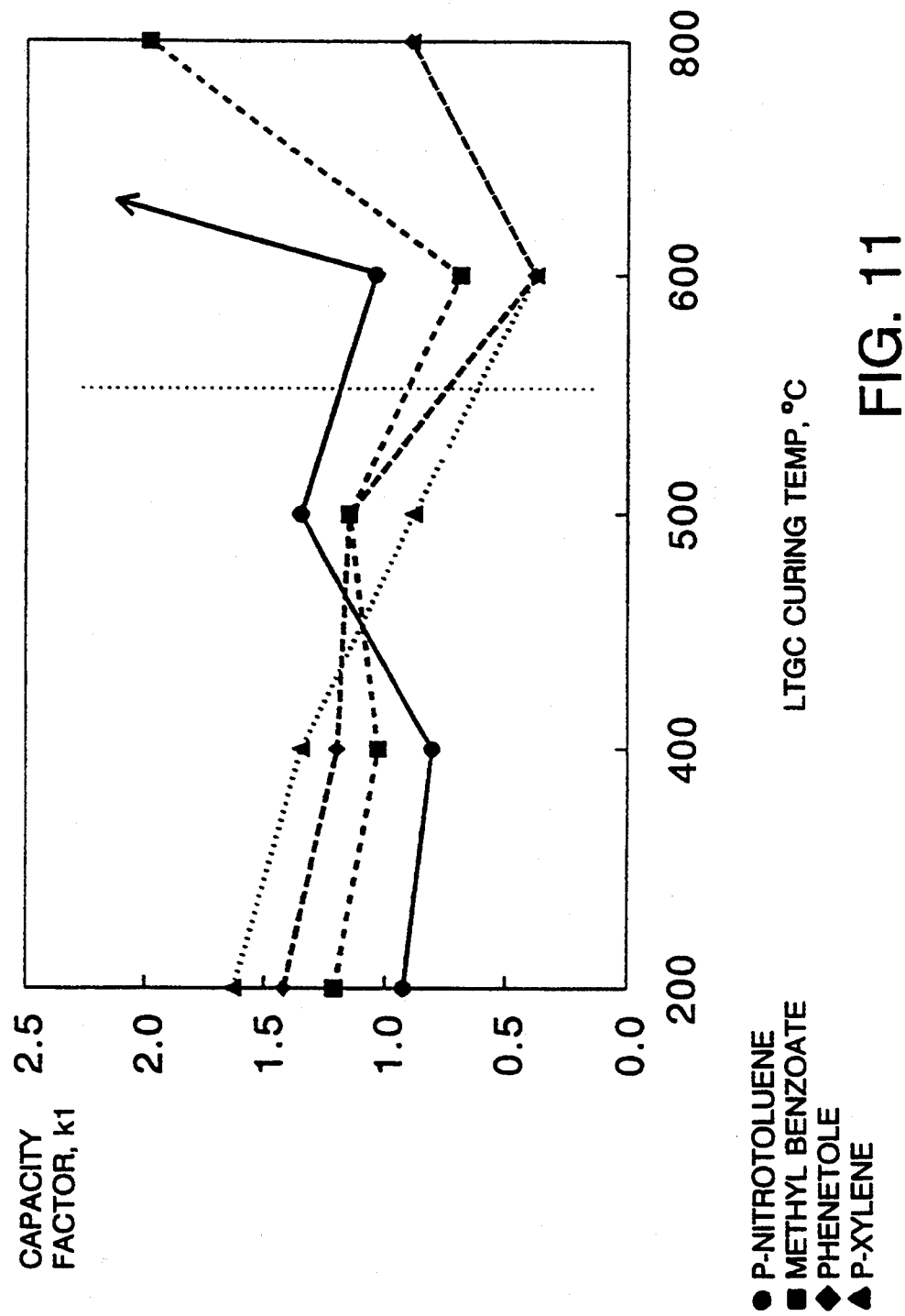
FIG. 11 is an illustration of the variation of test solute retention as a function of LTGC curing temperatures.

Overall changes in retention of reversed-phase test mix solutes as a function of glassy carbon process temperature are shown in FIG. 11. The retention behavior of commercial octadecyl (ODS) and phenyl (Phenyl) polysiloxane reversed-phase packings is also shown. The retention behavior of the ODS and Phenyl phases are very similar to the LTGC packings cured at or below 400° C. However, the retention behavior of the LTGC packings then changes gradually with higher curing temperature. The retention of the materials becomes much more dependent on the solute's polarity.

A linear free energy model was used to understand the nature of the selectivity and retentivity control found with the LTGCs. The model is described in the following equation:

$$\log k' = A + B\Omega + C\pi^* + D\alpha + E\beta \tag{1}$$

where k' is the solute capacity factor, a measure of solute retention, and the $\pi^*$, $\alpha$, and $\beta$ Kamlet-Taft parameters are constants which describe the solute's ability to participate in dipolar, hydrogen-bond acid, and hydrogen-bond base interactions, respectively. A, B, C, D and E are model coefficients. These solute capacity factors and their associated dispersive and specific interaction parameters were fit to equation (1) using a multivariable linear regression. The Kamlet-Taft solvatochromic parameters ($\pi^*$, $\alpha$, and $\beta$) of the solutes were used to indicate its ability to participate in selective interactions with the stationary phase. Solutes were chosen which varied significantly in size (i.e. dispersive energy) and polarity. Molar volume was chosen as an indication of solute dispersive energy. The solute dispersive energy parameters, $\Omega$, were generated by dividing the molar volumes of the solutes by the molar volume of the largest solute studied. This approach gives $\Omega$ values from 0.486 to 1, which are in agreement in magnitude with the scales developed for the Kamlet-Taft parameters. All independent variables used in this model are scaled to the same value ranges to permit valid comparison of calculated model coefficients.

The signs and magnitudes of the resultant calculated model coefficients reveal information regarding the retention behavior of the studied stationary phase/mobile phase system. Capacity factor data were collected for solutes separated on the LTGC prepared at 200° C., 400° C., 500° C., 600° C. and 800° C. and commercially-available octadecylpolysiloxane, phenyl polysiloxane, and Hypercarb phases. Statistical indicators show that the model is real. The F-test indicates whether the model is statistically significant to the 95 percent confidence level. The model passed the F-test.

Figure 12:
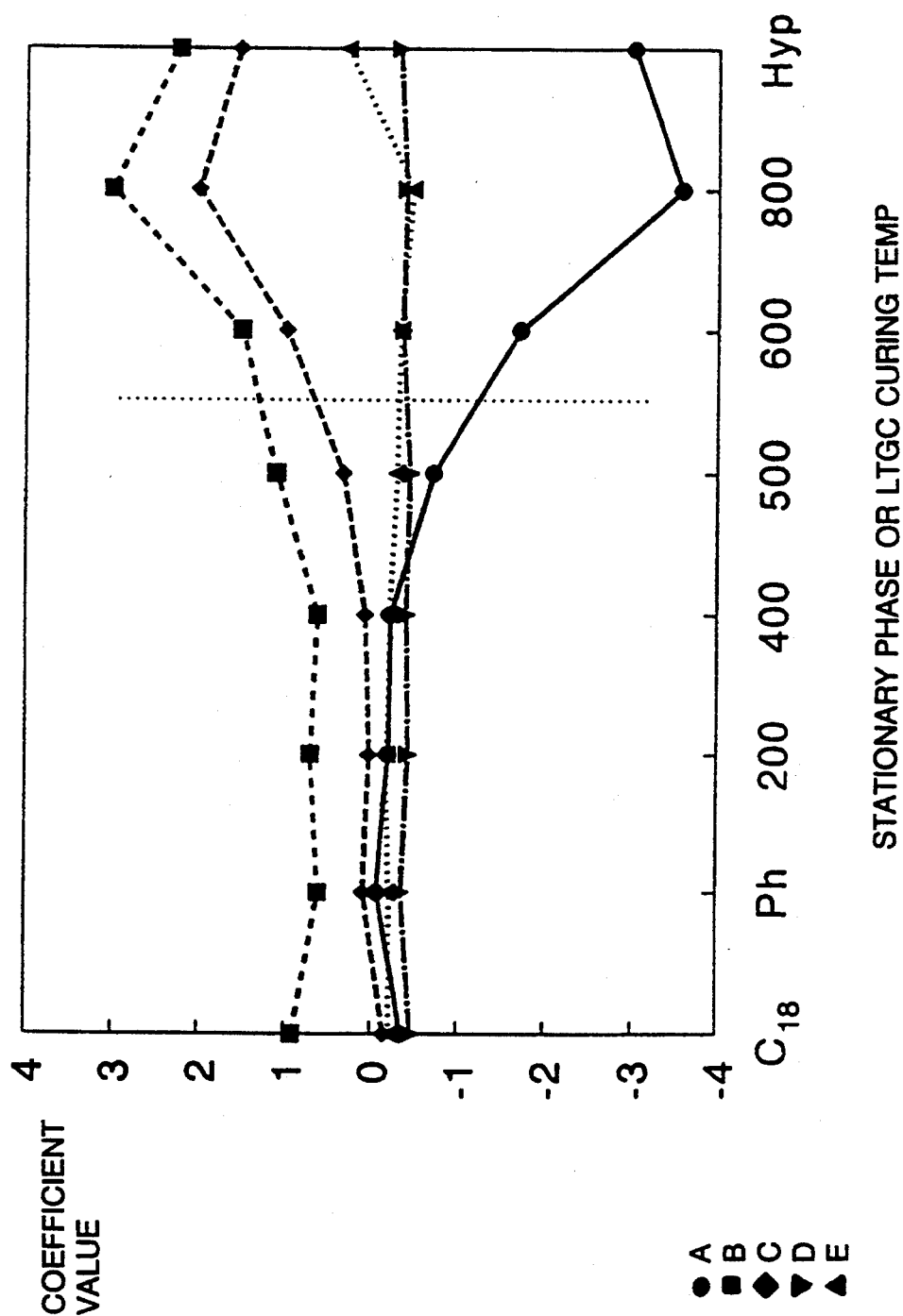
FIG. 12 is an illustration of the changes in model coefficients as a function of LTGC curing temperatures.

The trends in the model coefficients are easily evaluated as presented in FIG. 12. FIG. 12 shows the changes in model coefficients that occur when the LTGC is heated to different curing temperatures and compares these coefficients to those of the commercially-available octadecyl polysiloxane, phenyl polysiloxane, and Hypercarb packings. The A coefficient is an overall indicator of the retentivity of the stationary phase in the given chromatographic system. A is negative when materials are retained, and the absolute value of A increases as the retentivity of the stationary phase increases. Hypercarb, a commercially-available glassy carbon stationary phase, has an A coefficient equal to −3.02 in a strong, neat acetonitrile mobile phase system. The LTGC stationary phases that have been heated to 600° C. or higher also have large A coefficients ranging from −3.04 to −3.58. The commercially-available octadecyl and phenyl polysiloxane stationary phases and the LTGC materials that have not been heated past 500° C. yield much smaller A coefficients ranging from −0.07 to −1.92. These trends show that the carbon stationary phases are much more retentive than the more commonly-used polymeric stationary phases.

The remaining four coefficients are indicators of the relative importance of dispersive (B), dipolar (C), hydrogen-bond acid (D), and hydrogen-bond base (E) interactions in overall retention of solutes. The sign of the coefficient reveals the effect of the interaction on retention. Negative coefficients indicate that a solute possessing this particular chemical characteristic will elute early. Positive coefficients indicate that a solute possessing this particular characteristic are more retained. The magnitude of the coefficient indicates the relative importance of this interaction as compared to the other interactions being studied. If the absolute value of the coefficient is very large, it likely is the controlling interaction in the overall retention mechanism.

Dispersive interactions are an important factor in retention on all of the stationary phases studied. The dispersive interaction coefficient, B, is always positive and larger than any of the other interaction coefficients. Trends in the magnitude of B roughly follow those observed for A; B is larger for Hypercarb and LTGC samples that have been heated to at least 600° C. This indicates that larger solutes are more highly retained than small molecules on all of these stationary phases, but that this trend is even more pronounced for Hypercarb and the LTGC materials heated to at least 600° C.

In general, the dipolarity interaction coefficient, C, is small and negative or statistically insignificant for common reversed-phase HPLC conditions phases. This is the case for the octadecyl polysiloxane and phenyl polysiloxane commercially-available reversed-phase materials we studied. In most reversed-phase systems, the ability of a solute to participate in dipolar interactions has little or no effect on its retention. Alternatively, the commercially-available Hypercarb carbon stationary phase yielded a large, positive value of C. This confirms the importance of solute dipolarity in interacting with the $\pi$-electron system of the Hypercarb glassy carbon surface. Values of C for LTGC processed at low temperatures were similar to those measured for commercially available reversed-phase stationary phases, such as phenyl polysiloxane. The value of C. for LTGC processed at 600° C. was similar to that obtained for the commercially available Hypercarb. The C values for the LTGCs processed at intermediate temperatures increased with temperature. The LTGC processed at 800° C. has a C. value even greater than that of Hypercarb which suggests the importance of solute polarity on retention continues to increase with processing temperature.

The remaining hydrogen-bond acid and hydrogen-bond base interaction parameters, D and E, are normally small and negative for most reversed-phase packings. This again fits what is known about-reversed-phase materials; polar molecules elute earlier than less polar molecules. No trend is apparent in the values of D and E calculated for any of the phases studied. In most cases, the values of D and E were small and negative or statistically insignificant. These results indicate that Lewis acidity and basicity interactions play a small part if any in the overall retention mechanism.

In summary, the models generated using multivariable linear regression techniques indicate that the LTGC is very tunable. The most dramatic changes in the LTGC with increased curing temperature are its greater retentivity and increased selectivity in terms its affinity for solutes with significant dipolarity.

Open Tubular Chromatography

A solution was prepared by dissolving 5 mg of oligomer 1(R=6) in 1 ml of methylene chloride. A 1.5 meter length of 310 μm internal diameter fused silica was filled with the solution. One end of the fused silica was closed with a plug of SE-30 gum. The other end of the fused silica was attached to a vacuum line. The methylene chloride was evaporated from the column, leaving a deposit of oligomer on the inside surface of the tubing. The tube, still under vacuum, was placed in an oven, and the tube was heated from 45° C. to 400° C. at 1° C./minute and held at 400° C. for 30 minutes due to the upper temperature limit of the polyimide outside coating on the tube. The oven was shut off and the column was allowed to slowly cool to ambient temperature. The resultant coated tube possesses temperature, chemical, and mechanical stability and good selectivity properties, and can be used for open tubular chromatographies with gas, liquid, and supercritical fluid mobile phases.

Figure 4:
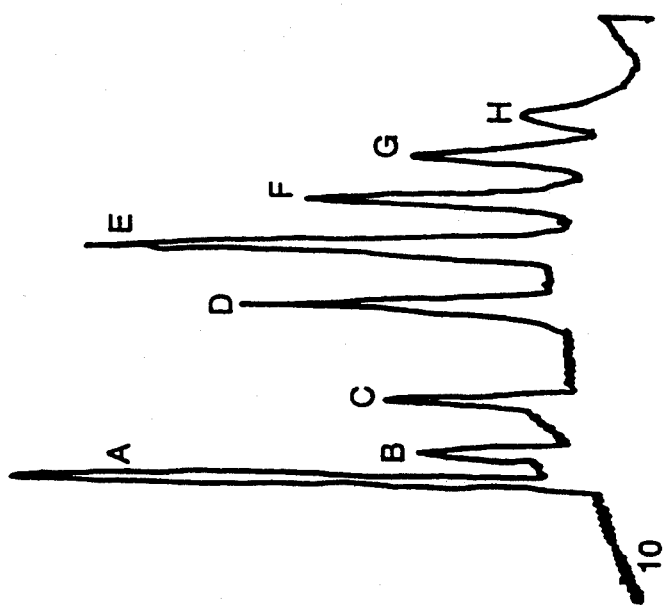
FIGS. 4 and 5 are illustrations of chromatograms obtained when an open tubular column coated with a LTGC film is used to separate mixtures of compounds.
Figure 5:
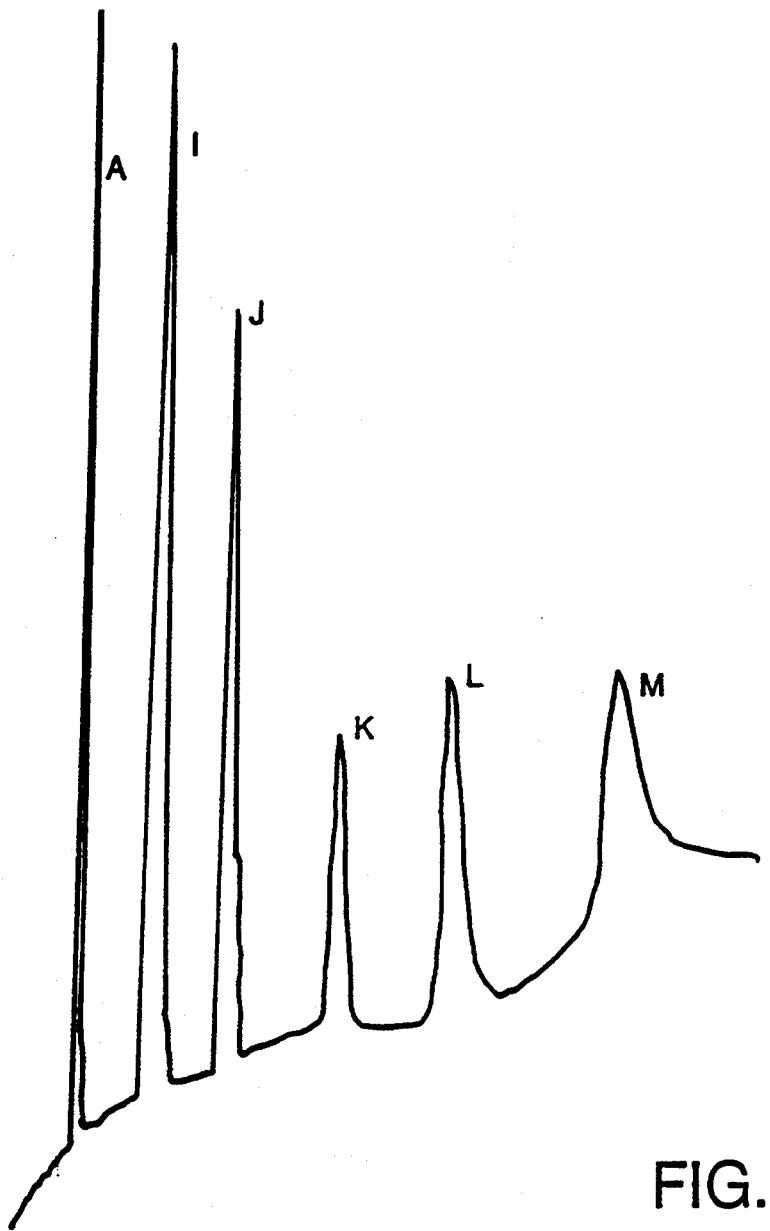

Referring to FIGS. 4 and 5, a LTGC coated open tubular fused silica column was used for separation of two mixtures by supercritical fluid chromatography (SFC). The mobile phase used was supercritical carbon dioxide. The mobile phase was delivered using a syringe pump (ISCO LC-2600). The mobile phase pressure was held at 1500 psi for five minutes, programmed from 1500 psi to 4500 psi at 150 psi/minute, and held at 4500 psi for 5 minutes. The samples consisted of 1 mg each of n-$C_{10}H_{22}$ (B), n-$C_{12}H_{26}$ (C), n-$C_{16}H_{34}$ (D), n-$C_{20}H_{42}$ (E), n-$C_{24}H_{50}$ (F), $C_{28}H_{58}$ (G), $C_{32}H_{66}$ (H), naphthalene (I), biphenyl (J), fluorene (K), phenanthrene (L), and pyrene (M), dissolved in 1 ml of carbon disulfide. Samples were introduced onto the column using a high-pressure injection valve fitted with a 60 nl rotor (W-series, Valco Instruments). The analytical column was a 1 meter long piece of 310-μm internal diameter fused silica tubing coated with glassy carbon. Maximum heating temperature was 400° C. due to the temperature limit of the polyimide exterior coating for both production and test. Higher temperatures to produce phases with unique characteristics can be made with metal tubing such as stainless steal or nickel. The column was maintained in an HP-5890 gas chromatography oven. The column temperature for testing was 80° C. for FIG. 4 and 200° C. for FIG. 5. A flame ionization detector was used to monitor elution of compounds from the analytical column. Peak A is the solvent.

Figure 8:
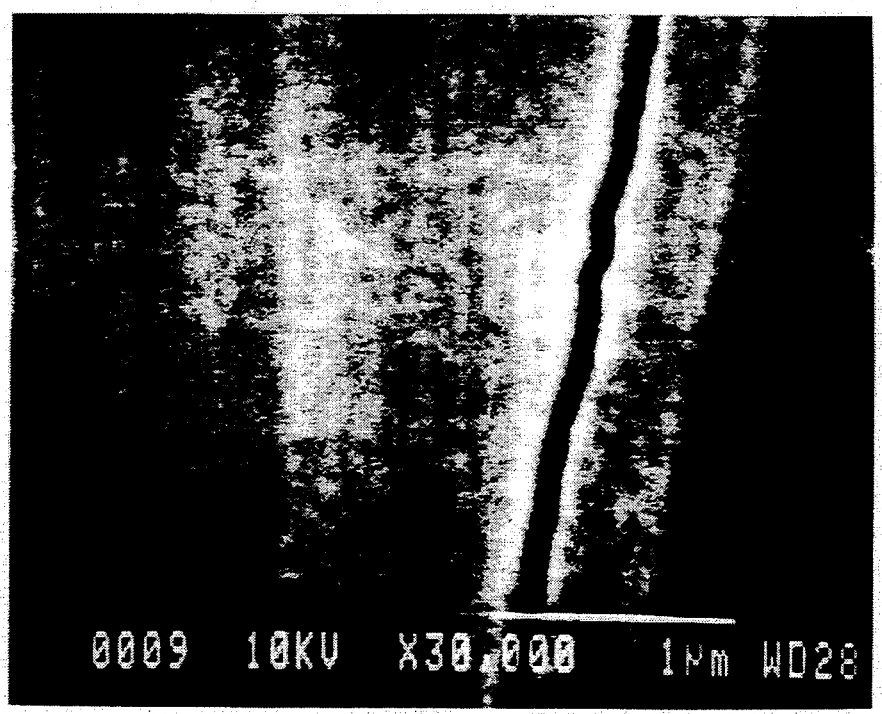
FIG. 8 is a electron micrograph of LTGC-coated nonporous silica tubing (inside surface coated; cross-section).

Referring to FIG. 8, a scanning electron micrograph of the cross-section of 310-μm fused silica tubing coated on the inside surface with LTGC (400° C. temperature treatment using procedure essentially as described earlier for oligomer 1 (R=6)) was generated. The thick layer is the tubing; the thin layer (right side) is the LTGC.

Particles Made of LTGC

A monodispersed aerosol (generated using a standard monodispersion generator) is injected into a low-temperature oven (80°–100° C.). The desolvated particles are sheathed with argon and injected into the previously described fluidized bed apparatus used to make the LTGC coated particles. The argon continues to flow in the fluidized bed apparatus while the oven temperature is slowly increased to 400° C. In order to modify the microcrystalline lattice size of the LTGC coating, the particles can be put in an evacuated quartz tube, placed in an oven, and heated to higher temperatures (400°→600° C). The size of solid particles produced will be controlled by the size of the orifice on the monodispersed generator and the solvent used. The size of the particle produced by this method will vary from <1 μm to 500 μm in diameter.

Significantly, the solid particles (like all coated substrates) are produced at lower temperatures without having contact with caustic solutions such as concentrated sodium hydroxide. In addition, a template is not required, so active sites due to the presence of the template material are eliminated.

Outer Coating on Tubing

The LTGC can be applied to the outside surface of a chromatography tube (e.g., fused silica tubing) as a protective coating. The coating enhances the structural stability of the tube, protects the silica surface from chemical (moisture) attack, and is preferably suited for temperatures above 400° C. in air, more preferably up to 500° C., and most preferably up to 550° C.

The LTGC is applied to the silica tubing by passing it through a solution of an oligomeric precursor in, e.g., methylene chloride. The solvent is removed by evaporation in an inert atmosphere, and the tubing is heated to the desired final temperature (in an analogous fashion to the previous procedures) in an inert-atmosphere oven to provide the LTGC coated tubing.

Other Embodiments

Other embodiments are within the claims. For example, the preparation procedure for packed and open tubular GC columns is nearly identical to that described for preparation of packed HPLC columns and open tubular SFC columns. In fact the packed and open tubular columns described earlier can each be used in similar forms for GC, SFC, and HPLC. For example, it is preferable that the glassy carbon coat all of, e.g., silica particle or inner surface of a tube, the benefits of the invention may be achieved if only part of the surface of the particles or tube are coated with the film of LTGC. The LTGC can be used in common bulk separation procedures, like solid phase extraction (SPE); a conventional separation technique for extraction, concentration, and clean-up of complex samples prior to assay by a technique such as gas or liquid chromatography. For example, a short glass or plastic tube can be filled with large porous particles (40–60 μm) coated with LTGC as described previously, to impart high permeability to the SPE tube; the complex samples are passed through the tube using an appropriate solvent as the eluent. The high selectivity and retentivity, and reverse-phase behavior of some of the preferred LTGCs along with their unusual chemical stability, make their ideally suited for SPE. The relatively low cost production methods of the invention make disposable LTGC SPE tubes or columns possible.

LTGC can also be used as the stationary phase in common thin layer chromatography (TLC) or planar chromatography, a separation technique for rapid sample screening. Like an SPE device, TLC plates are not used more than once and must therefore by prepared by a very cost-effective method. In one embodiment of the invention for TLC, porous particles in the 10 μm size range would be coated with LTGC in a manner similar to that described for preparing LTGC coated LC packings. Particles are suspended in solvent, coated on a planar surface such as a glass plate and dried prior to use.

LTGC also be useful for electrophoretic techniques such as capillary electrophoresis. Shomburg, 10 *Trends in Analytical Chemistry* 163 (1991), describes how a polymer or other material is often coated onto exposed silica, glass or other surfaces to control the electroosmotic flow and minimize adsorption of analytes onto the support surface. The LTGC layer can also impart useful selectivity to the inside surface of a capillary or particle, in which case the technique can be referred to as electrokinetic chromatography.

We claim:

1. A chemical separation process having a stationary phase and a mobile phase, that uses as the stationary phase glassy carbon derived from at least one acetylene group-containing oligomer, said process comprising:
   (a) heating to 200 to 900 degrees Centigrade an aromatic oligomer with a molecular weight of from 1000 to 100,000 and containing acetylene groups, for a sufficient period of time to cross-link said oligomer to form glassy carbon, whereby no significant loss of carbon mass occurs; and
   (b) using said glassy carbon as the stationary phase in a process for the separation of chemical compounds, whereby a mobile phase containing a mixture of compounds to be separated is contacted with the stationary phase, whereby the compounds in the mixture separate, and whereby the selectivity and retentivity of the glassy carbon stationary phase are improved relative to the selectivity and retentivity of a chemical separation process using a glassy carbon stationary phase derived from an aromatic oligomer not containing acetylene groups.

2. The separation process of claim 1 wherein said glassy carbon comprises a coating on substrate.

3. The separation process of claim 2, further comprising coating said particles with said oligomer prior to said heating step.

4. The separation process of claim 1 wherein said separation process is packed-column chromatography.

5. The separation process of claim 1 wherein said separation process is open-tubular chromatography.

6. The separation process of claim 1 wherein said separation process is supercritical fluid chromatography.

7. The separation process of claim 1 wherein said separation process is electrophoresis or electrokinetic chromatography.

8. The separation process of claim 1 wherein said glassy carbon comprises a film on the inner surface of a tube.

9. The separation process of claim 8, further comprising coating said inner surface of said tube with said oligomer prior to said heating step.

10. The separation process of claim 8 wherein said separation process is open tubular chromatography.

11. The separation process of claim 1 wherein said glassy carbon is formed by heating the oligomer to a temperature of 800° to 1000° C., whereby the glassy carbon stationary phase is more retentive than a glassy carbon stationary phase formed by heating an oligomer to a temperature less than 800° C.

12. The separation process of claim 1 wherein said glassy carbon is formed by heating the oligomer to a temperature of 600° to 800° C., whereby the glassy carbon stationary phase has increased selectivity toward polar compounds relative to the selectivity toward polar compounds exhibited by a glassy carbon stationary phase formed by heating an oligomer to temperatures below 600° C.

13. The separation process of claim 1 wherein said glassy carbon is formed by heating the oligomer to a temperature of 400° to 600° C., whereby the glassy carbon stationary phase is less retentive than a glassy carbon stationary phase formed by heating an acetylene-containing oligomer to temperatures above 600° C., and is more retentive than a glassy carbon stationary phase formed by heating an acetylene-containing oligomer to temperatures below 400° C., and whereby the glassy carbon stationary phase has increased selectivity toward polar compounds relative to the selectivity of a glassy carbon stationary phase formed by heating an acetylene-containing oligomer to temperatures below 400° C., and has reduced selectivity toward polar compounds relative to the selectivity of a glassy carbon stationary phase formed by heating an acetylene-containing oligomer at temperatures above 600° C.

14. The separation process of claim 1 wherein said glassy carbon is formed by heating the oligomer to a temperature of 200° to 400° C., whereby the glassy carbon stationary phase retains nonpolar compounds more strongly than it retains polar compounds.

* * * * *

UNITED STATES PATENT AND TRADEMARK OFFICE
CERTIFICATE OF CORRECTION

PATENT NO. : 5,431,821
DATED : Jul. 11, 1995
INVENTOR(S) : Olesik et al.

It is certified that error appears in the above-indentified patent and that said Letters Patent is hereby corrected as shown below:

Column 1, line 8, after "separation" insert --processes.--; line 11, after "It" insert --is--; line 12, after "hardness" insert a comma; line 13, after "permeability" insert --to--; line 15, after "known" insert --in--; line 17, "Now York" should read --New York--; line 20, "additional" should be capitalized to --Additional--; line 28, after "little" insert --mass--; line 30, after "and" insert --halides--; line 34, "fern" should read --form--. Claim 2, line 2, after "on" insert --a--.

Signed and Sealed this

Twenty-eighth Day of November 1995

Attest:

BRUCE LEHMAN

*Attesting Officer*  *Commissioner of Patents and Trademarks*